United States Patent [19]
Konnai et al.

[11] Patent Number: 6,036,938
[45] Date of Patent: Mar. 14, 2000

[54] POTASSIUM TITANATE SUBSTANTIALLY FREE OF RESPIRABLE FIBERS AND METHOD FOR PRODUCING THE SAME

[75] Inventors: Hidefumi Konnai; Yoshio Suzuki; Yoshio Aso, all of Tokyo, Japan

[73] Assignee: Kawatetsu Mining Co., Ltd., Tokyo, Japan

[21] Appl. No.: 09/004,062

[22] Filed: Jan. 8, 1998

[30] Foreign Application Priority Data

Feb. 28, 1997 [JP] Japan ..................... 9-046108

[51] Int. Cl.⁷ .......................... C01B 13/14; C01G 23/00; C01D 1/00
[52] U.S. Cl. .......................... 423/592; 423/598; 423/641
[58] Field of Search ..................... 423/592, 598

[56] References Cited

U.S. PATENT DOCUMENTS

| | | |
|---|---|---|
| 4,064,224 | 12/1977 | Kawamata et al. ............... 423/598 |
| 4,179,496 | 12/1979 | Yanagida et al. ............... 423/598 |
| 4,265,872 | 5/1981 | Fujiki ............... 423/598 |
| 4,390,513 | 6/1983 | Fujiki ............... 423/598 |
| 4,652,439 | 3/1987 | Nishiuchi et al. ............... 423/598 |
| 4,689,211 | 8/1987 | Nishiuchi et al. ............... 423/598 |
| 4,732,749 | 3/1988 | Watannabe et al. ............... 423/598 |
| 4,810,439 | 3/1989 | Fujiki et al. ............... 264/42 |
| 5,340,645 | 8/1994 | Harada et al. ............... 428/292 |
| 5,407,754 | 4/1995 | Harada et al. ............... 428/614 |
| 5,563,199 | 10/1996 | Harada et al. ............... 524/413 |

*Primary Examiner*—Gary P. Straub
*Assistant Examiner*—Cam N. Nguyen
*Attorney, Agent, or Firm*—Oliff & Berridge, PLC

[57] ABSTRACT

The potassium titanate of the present invention comprises particles of a diameter of 3 $\mu$m or less and a length of 5 $\mu$m or more with a ratio of the length to the diameter of 3:1 or more, at a content in number of 3% or less, with no hazardous particles contained therein from the respect of health and hygiene. The potassium titanate can be produced by heating a Ti source and a K source as the raw materials to a final $TiO_2:K_2O$ ratio of 5.5:1 to 6.5:1 at a temperature elevation rate of 20° C./min in the temperature region above 800° C.

8 Claims, No Drawings

6,036,938

POTASSIUM TITANATE SUBSTANTIALLY FREE OF RESPIRABLE FIBERS AND METHOD FOR PRODUCING THE SAME

BACKGROUND OF THE INVENTION

1. Field of the Invention

The present invention relates to a type of potassium titanate for use as an additive and the like to be added to plastics, frictional materials, paints, lubricants, heat resistant materials, heat insulation materials or paper. More specifically, the present invention relates to a non-fibrous potassium titanate with a characteristic shape significant for health and hygiene, such that no hazardous effect might be caused even if a person inhales the potassium titanate; and a method for producing the same.

2. Description of the Related Art

Potassium titanate is generally in the form of fiber, and is practically used widely as an additive for improving the performance in the fields of plastics, paints, frictional materials and the like. However, fibrous powder is characteristically so bulky with poor fluidity that such powder is handled with much difficulty. Furthermore, fibrous powder readily generates powdery dust, disadvantageously from the respect of industrial environment.

For example, the carcinogenicity of asbestos has been drawing concern, and it is suggested that the carcinogenicity has some relation with the fibrous shape thereof. According to the hypothesis of Stanton, a fiber at a fiber diameter of 0.25 μm or less and a length of 8 μm or more has higher carcinogenicity. According to the International Labor Organization (ILO), furthermore, a fiber at a diameter of 3 μm or less and a length of 5 μm or more with a ratio of the length and the diameter being 3:1 or more is defined as an respirable fiber.

It is not elucidated yet as to the possibility that the fiber of potassium titanate affects the health of for example respiration system. In any way, less respirable fiber is desirable.

Because potassium titanate is so bulky with poor fluidity, however, the smooth feeding thereof is difficult, causing the attachment of the powder onto the wall of a feeding conduit to occlude the conduit, disadvantageously. Because of such phenomenon, the micro-pulverization thereof induces prominent cost escalation, so that it is difficult to produce industrially such micro-pulverized powder.

SUMMARY OF THE INVENTION

It is an object of the present invention to provide a type of potassium titanate containing substantially no particles with the shape of respirable fiber, and a method for producing the same.

The present invention has been developed so as to attain the object described above and provides a non-fibrous potassium titanate at a content of not more than 3% of particles at a diameter of 3 μm or less and a length of 5 μm or more with a ratio of the length and the diameter being 3:1 or more.

The potassium titanate with such properties can be produced by the following means. More specifically, the method for producing potassium titanate in accordance with the present invention comprises mixing together a powdery Ti source and a powdery K source, generating $TiO_2$ and $K_2O$, respectively on heating, at a molar ratio in $TiO_2 : K_2O$ of 5.5:1 to 6.5:1, heating the resulting mixture material to be heated in a temperature region at 800° C. or more at a temperature elevation rate of 20° C./min or more up to the maximum temperature, and thereafter cooling the produced matter and cracking the matter.

DETAILED DESCRIPTION OF THE PREFERRED EMBODIMENTS

Potassium titanate has characteristic physical properties such as high whiteness, low Mohs' hardness, low thermal conductivity, and high refractive index, and has substance characteristics such as good thermal resistance, chemical resistance, and wear resistance. Other than the use of reinforcing fiber, thus, potassium titanate can be used as an additive and the like to be added to plastics, frictional materials, paints, lubricants, heat resistant materials, heat insulation materials or paper. Furthermore, the drawbacks of fibrous powder such as bulkiness and poor fluidity are improved in the potassium titanate of the present invention, and therefore, the potassium titanate is applicable widely.

In accordance with the present invention, the length and diameter of a crystal shape and the ratio thereof are designated as a standard for assessing the fiber property, but no absolute definition has been established yet as to the limitation of the shape of the non-fibrous potassium titanate, from the respect of health and hygiene. Therefore, the standard is defined with reference to the ILO standard concerning respirable fiber. Then, a new standard is set up such that the ratio of the number of particles meeting the ILO standard should be below 3%. Then, the assessment is made according to the new standard. As to the ratio of the number, no definite standard from the respect of health and hygiene has been established yet. From probability standpoint with a broad safety margin, in accordance with the present invention, the present inventors have determined the standard for the ratio.

The non-fibrous potassium titanate of the present invention contains substantially no particles in a fiber region. Among the characteristic properties of conventional fibrous potassium titanate, the reinforcing potential of the present substance is poorer, but the substance can be used extremely safely from the respect of health and hygiene and is widely accepted as a raw material for various utilities. The reinforcing potential generally elevates the strength of molded matters. Thus, the substance has higher industrial applicability, thus making great contribution to industrial development.

As to potassium titanate, potassium dititanate ($K_2O.2TiO_2$), potassium tetratitanate ($K_2O.4TiO_2$), potassium hexatitanate ($K_2O.6TiO_2$), and potassium octatitanate ($K_2O.8TiO_2$) have been known. Among them, a substance of a composition of potassium dititanate ($K_2O.2TiO_2$), potassium tetratitanate ($K_2O.4TiO_2$) or potassium hexatitanate ($K_2O.6TiO_2$) can be produced directly through heating. Potassium dititanate ($K_2O.2TiO_2$) or potassium tetratitanate ($K_2O.4TiO_2$) readily turns fibrous shape on heating, but potassium hexatitanate ($K_2O.6TiO_2$) essentially does not grow into fiber. When a Ti source and a K source as initial raw materials are heated, however, potassium oxide produced from the K source is firstly melted and the reaction system is therefore enriched with potassium at its initial melted part. Thus, potassium dititanate ($K_2O.2TiO_2$) and potassium tetratitanate ($K_2O.4TiO_2$) are produced. Further continuing heating, the titanium oxide around is incorporated, but the initially grown fiber shape still remains in a region in the resulting shape.

In accordance with the present invention, a production method capable of reducing the ratio of the number of respirable fiber below 3% is developed, while at laboratory levels, the ratio of respirable fiber after micro-pulverization is limited to about 5%.

Such material can be produced readily, by mixing a Ti source and a K source at an appropriate molar ratio and heating the mixture at a larger temperature elevation rate in the temperature region above 800° C.

As the Ti source, use is made of titanium oxide, titanium hydroxide and the like, and as the K source, use is made of carbonate salts, hydrogen carbonate salts, nitrate salts, sulfate salts and the like. Instead of the K source, a Na source generating $Na_2O$ can generate sodium hexatitanate with the same properties as those of potassium hexatitanate. Thus, a part of the K source or the entirety thereof can be replaced with the Na source.

The reason why the molar ratio of $TiO_2:K_2O$ is set at 5.5:1 to 6.5:1 resides in that the molar ratio should be equal to the molar ratio composing the final product. Most preferably, the molar ratio is 6:1, which is equal to the molar ratio of potassium hexatitanate; 5.8:1 to 6.2:1 is also preferable; and 5.9:1 to 6.1:1 is further preferable. Provided that the molar ratio is at least within a molar ratio range of 5.5:1 to 6.5:1 even if the molar ratio is not necessarily equal to the stoichiometric molar ratio, potassium hexatitanate is generated within the range, which is confirmed by X-ray diffraction analysis.

The upper limit of the temperature region above 800° C. where the temperature elevation rate should be increased is the maximum temperature attained. The intended maximum temperature is 1000 to 1300° C. The reason of rapid heating in the temperature region above 800° C. is that the generation of potassium dititanate or potassium tetratitanate should be suppressed. The upper limit of the temperature region where rapid heating should be conducted is preferably above the melting point of potassium titanate, which is 1114° C. Taking account of the melting point of potassium hexatitanate, the upper limit is up to 1200° C.

Individual potassium titanate products have the following melting points;

| | |
|---|---|
| potassium dititanate | 965° C. |
| potassium tetratitanate | 1114° C. |
| potassium hexatitanate | 1370° C. |

The crystal growth occurs at a temperature slightly lower than these melting points. In accordance with the present invention, the temperature region where the crystals of potassium dititanate and potassium tetratitanate grow should be passed as fast as possible at a temperature elevation rate above 20° C./min, whereby the formation of the shapes derived from potassium dititanate and potassium tetratitanate can be suppressed, to recover the non-fibrous potassium titanate.

Any temperature elevation rate in the temperature region less than 800° C. may be satisfactory, even if the rate is fast or slow, but because rapid heating is effected in the temperature region above 800° C., practically, rapid heating is also effected in the temperature region below 800° C., correspondingly.

The reason why the temperature elevation rate is set above 20° C./min is that the generation of potassium dititanate or potassium tetratitanate would be suppressed with much difficulty below 20° C./min. The upper limit of the temperature elevation rate is thus defined from the respect of equipment capability and from the respect of the protection of refractory materials and the regulation over equipment and maintenance and from economical standpoint.

Even if a powdery Ti source and a powdery K source are mixed together at a molar ratio of $TiO_2:K_2O$ at 5.5:1 to 6.5:1 to be then reacted under heating at a slow temperature elevation rate, such slow temperature elevation rate helps the fibrous potassium dititanate and potassium tetratitanate grow in the potassium-rich phase primarily melted, so that no objective non-fibrous product can be recovered. Therefore, rapid heating should be effected, in order that the temperature region where potassium dititanate and potassium tetratitanate readily grow should be passed as fast as possible. Consequently, the growth of potassium dititanate and potassium tetratitanate can be suppressed when the temperature elevation rate up to the maximum temperature of 1200° C. is set to a rapid temperature elevation rate for example above 20° C./min, whereby the objective non-fibrous potassium hexatitanate can be recovered. Because the potassium hexatitanate produced in such manner is at a slightly sintered state, the potassium hexatitanate is then cooled and crushed to an appropriate particle size with a crushing machine, to be prepared then as a final product.

For applying the potassium hexatitanate of the present invention to various utilities, surface treatment such as coupling agents may satisfactorily be done to meet the object.

If the non-fibrous powdery potassium titanate in accordance with the present invention is used in a frictional material, it is found that the frictional performance of the resulting material is more stable at low temperature to high temperature than that of conventional potassium titanate in powder. Not apparently shown, the reason may be such that the powdery potassium titanate of the present invention is at a low fibrous degree than conventional potassium titanium in powder, so that the crystal phase of potassium titanate on the side and bottom of the cubic crystal are arranged uniformly on the sliding part of the frictional material.

EXAMPLES

Mixing together a titanium oxide powder and a potassium carbonate powder at a molar ratio in $TiO_2:K_2O$ of 6:1, mixing the raw materials together by means of a blender for 10 minutes, heating the resulting mixture powder under conditions of temperature elevation rates of 7° C./min, 20° C./min and 30° C./min at 800° C. to 1130° C., in an electric furnace equipped with a temperature program control, and keeping the resulting products as they are for 20 minutes, the products are crushed with an impact mill.

By image analysis of electron microscope images of the resulting potassium titanate powders, the number of particles of a diameter of 3 μm or less and a length of 5 μm or more at a ratio of the length to the diameter of 3:1 or more is calculated. As shown in Table 1, the number of such particles are 6.6%, 1.3% and 0.7%, at temperature elevation rates of 7° C./min, 20° C./min and 30° C./min, respectively. Preferable results can be yielded at a temperature elevation rate above 20° C./min, and further, more preferable results are yielded at a temperature elevation rate above 30° C./min. A high temperature elevation rate within a range allowable from the respect of equipment is preferable.

For comparison, herein, two commercially available potassium titanate fiber products are examined to calculate the number of the particles therein of a diameter of 3 μm or less and a length of 5 μm or more at a ratio of the diameter and the length of 3:1 or more. The results are also shown in Table 1. In the commercially available products, the numbers are 14.0% and 31.3%, individually.

TABLE 1

|  | Comparative Examples | | | Examples | |
| --- | --- | --- | --- | --- | --- |
| No. | 1 | 2 | 3 | 4 | 5 |
| Temperature elevation rate (° C./min) | commercially available product A | commercially available product B | 7 | 20 | 30 |
| Ratio (%) of the number of particles of a diameter of the length 3 μm or less and a length of 5 μm or more at a ratio of the diameter of 3:1 or more | 14.0 | 31.3 | 6.6 | 1.3 | 0.7 |

What is claimed is:

1. Potassium titanate crystals in which 3% or less by number of the potassium titanate crystals have a diameter of 3 μm or less and a length of 5 μm or more with a ratio of the length to the diameter of 3:1 or more.

2. A frictional material comprising, as an additive, potassium titanate crystals according to claim 1.

3. A plastic material comprising, as an additive, potassium titanate crystals according to claim 1.

4. Paint comprising, as an additive, potassium titanate crystals according to claim 1.

5. A lubricant comprising, as an additive, potassium titanate crystals according to claim 1.

6. A heat resistant material comprising, as an additive, potassium titanate crystals according to claim 1.

7. A heat insulation material comprising, as an additive, potassium titanate crystals according to claim 1.

8. Paper comprising, as an additive, potassium titanate crystals according to claim 1.

* * * * *